United States Patent
Yoshizawa et al.

(10) Patent No.: US 8,114,813 B2
(45) Date of Patent: Feb. 14, 2012

(54) THERMAL TRANSFER INK SHEET, INK CARTRIDGE, COATING COMPOSITION FOR DYE LAYER OF THERMAL TRANSFER INK SHEET, AND THERMAL TRANSFER RECORDING METHOD

(75) Inventors: Masataka Yoshizawa, Kanagawa (JP); Naotsugu Muro, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 991 days.

(21) Appl. No.: 12/056,680

(22) Filed: Mar. 27, 2008

(65) Prior Publication Data

US 2008/0242540 A1    Oct. 2, 2008

(30) Foreign Application Priority Data

Mar. 30, 2007  (JP) .................................. 2007-092239

(51) Int. Cl.
- B41M 5/035 (2006.01)
- B41M 5/337 (2006.01)
- B41M 5/50 (2006.01)

(52) U.S. Cl. ............ 503/227; 156/235; 428/32.6; 524/1

(58) Field of Classification Search ...................... None
See application file for complete search history.

(56) References Cited

U.S. PATENT DOCUMENTS 6,372,689 B1    4/2002    Kuga et al.

FOREIGN PATENT DOCUMENTS

| | | |
|---|---|---|
| EP | 0 495 439 A1 | 7/1992 |
| EP | 0 537 485 A | 4/1993 |
| EP | 1 429 400 A1 | 6/2004 |
| GB | 940 199 A | 10/1963 |
| JP | 06-72055 A | 3/1994 |
| JP | 09-141973 A | 6/1997 |
| JP | 11-227345 A | 8/1999 |
| JP | 2000-280637 A | 10/2000 |
| JP | 2000-309172 A | 11/2000 |
| JP | 2004-90282 A | 3/2004 |
| WO | 2006/051092 A | 5/2006 |

OTHER PUBLICATIONS

An extended European Search Report dated Jul. 11, 2008.
An extended European Search Report dated Jul. 9, 2008.
Office Action dated Dec. 7, 2010 on Japanese Application No. JP 2007-092239.

*Primary Examiner* — Bruce H Hess

(74) *Attorney, Agent, or Firm* — Sughrue Mion, PLLC

(57) ABSTRACT

A thermal transfer ink sheet comprising, as formed on a support, a dye layer containing a thermal transferable dye in a resin binder, wherein the dye layer contains a polyvinyl acetal modified with at least one compound of the following formula [1]:

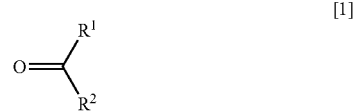

wherein one of $R^1$ and $R^2$ is a branched hydrocarbon group and the other is a hydrogen atom or a hydrocarbon group, or $R^1$ and $R^2$ are groups that bond to each other to form a cyclic hydrocarbon.

6 Claims, No Drawings

THERMAL TRANSFER INK SHEET, INK CARTRIDGE, COATING COMPOSITION FOR DYE LAYER OF THERMAL TRANSFER INK SHEET, AND THERMAL TRANSFER RECORDING METHOD

BACKGROUND OF THE INVENTION

1. Field of the Invention

The present invention relates to a thermal transfer ink sheet containing a polyvinyl acetal having a specific structure, and to an ink cartridge, a coating composition for dye layer of thermal transfer ink sheet, and a thermal transfer recording method.

2. Background Art

These days, in particular, a color image-forming material is the mainstream of an image-recording material; and concretely, inkjet-type recording materials, thermal transfer-type image-recording materials, electrophotographic recording materials, transfer-type silver halide photosensitive materials, printing inks and recording pens are much used.

Thermal transfer recording includes a recording system where a thermal transfer material having a thermofusible ink layer formed on a support (base film) is heated with a thermal head to thereby melt the ink for recording on an image-recording material, and a recording system where a thermal transfer material having a thermal transferable dye-containing dye-donating layer formed on a base film is heated with a thermal head to thereby thermally diffuse and transfer the dye onto an image-receiving material. In the latter thermal transfer system, the dye transfer rate may be varied by changing the energy to be applied to the thermal head, therefore facilitating gradation recording, and the system is especially advantageous for high-quality full-color recording.

In the thermal diffusive transfer recording system, a dye-containing thermal transfer sheet (hereinafter this may be referred to as "ink sheet") and a thermal transfer image-receiving sheet (hereinafter this may be referred to as "image-receiving sheet") are put one upon another, and then the ink sheet is heated with a thermal head from which the heat generation is controlled by an electric signal applied thereto, whereby the dye in the ink sheet is transferred onto the image-receiving sheet to attain image information recording thereon. In the system, three colors of cyan, magenta and yellow may be transferred and recorded on the sheet, thereby producing a color image having a continuous color gradation.

An ink sheet polymer plays a role of holding a dye in the thermal transfer sheet, and polyester resins have heretofore been used for it. Polymer materials capable of forming color images of high density are reported in JP-A 4-45993 and JP-A 2002-307844. These days, however, the increase in the printing speed is extremely great, and the above resins could hardly satisfy both the requirement for the rapid transfer printing speed and the requirement for good photographic properties of high transfer sensitivity.

SUMMARY OF THE INVENTION

The invention is to provide a thermal transfer ink sheet having high sensitivity and capable of giving a good image with few image defects, and to provide an ink cartridge, a coating composition for dye layer of thermal transfer ink sheet, and a thermal transfer recording method.

The present inventors have assiduously studied and, as a result, have found that the above-mentioned objects can be attained by the following constitution:

(1) A thermal transfer ink sheet comprising, as formed on a support, a dye layer containing a thermal transferable dye in a resin binder, wherein the dye layer contains a polyvinyl acetal modified with at least one compound of the following formula [1]:

[1]

wherein one of $R^1$ and $R^2$ is a branched hydrocarbon group and the other is a hydrogen atom or a hydrocarbon group, or $R^1$ and $R^2$ are groups that bond to each other to form a cyclic hydrocarbon.

(2) The thermal transfer ink sheet according to the above (1), wherein, in formula [1], one of $R^1$ and $R^2$ is a branched hydrocarbon group having from 4 to 50 carbon atoms, or $R^1$ and $R^2$ are groups that bond to each other to form a cyclic hydrocarbon.

(3) The thermal transfer ink sheet according to the above (1), wherein, in formula [1] one of $R^1$ and $R^2$ is a branched hydrocarbon group having from 8 to 40 carbon atoms, or $R^1$ and $R^2$ are groups that bond to each other to form a cyclic hydrocarbon.

(4) An ink cartridge filled with the thermal transfer ink sheet of any one of the above (1) to (3).

(5) A thermal transfer recording method comprising forming an image by use of the thermal transfer ink sheet of any one of the above (1) to (3) on an image-receiving sheet comprising a polymer latex-containing ink-receiving layer on a support.

(6) A coating composition for forming a dye layer of a thermal transfer ink sheet, containing a thermal transferable dye and a polyvinyl acetal modified with at least one compound of the following formula [1]:

[1]

wherein one of $R^1$ and $R^2$ is a branched hydrocarbon group and the other is a hydrogen atom or a hydrocarbon group, or $R^1$ and $R^2$ are groups that bond to each other to form a cyclic hydrocarbon.

According to the invention, there are provided a thermal transfer ink sheet having high sensitivity and capable of giving a good image with few image defects, and to provide an ink cartridge, a coating composition for dye layer of thermal transfer ink sheet, and a thermal transfer recording method.

BEST MODE FOR CARRYING OUT THE INVENTION

The thermal transfer recording ink sheet, the ink cartridge, the coating composition and the thermal transfer recording method are described in detail hereinunder.

The description of the constitutive elements of the invention given hereinunder is for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

The polyvinyl acetal for use in the invention is described.

The polyvinyl acetal for use in the invention is modified with an aldehyde and/or a ketone of the formula [1]. The polyvinyl acetal in the invention includes a ketal modified with a ketone of formula [1].

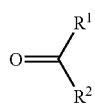
[1]

In formula [1], one of $R^1$ and $R^2$ is a branched hydrocarbon group and the other is a hydrogen atom or a hydrocarbon group, or $R^1$ and $R^2$ are groups that bond to each other to form a cyclic hydrocarbon.

Preferably, one of $R^1$ and $R^2$ is a branched hydrocarbon group having from 4 to 50 carbon atoms, or $R^1$ and $R^2$ are groups that bond to each other to form a cyclic hydrocarbon; more preferably, one of $R^1$ and $R^2$ is a branched hydrocarbon group having from 8 to 40 carbon atoms, or $R^1$ and $R^2$ are groups that bond to each other to form a cyclic hydrocarbon; even more preferably, one of $R^1$ and $R^2$ is a branched hydrocarbon group having from 12 to 30 carbon atoms, or $R^1$ and $R^2$ are groups that bond to each other to form a cyclic hydrocarbon.

The cyclic hydrocarbon to be formed by $R^1$ and $R^2$ bonding to each other is preferably a 5-membered to 7-membered hydrocarbon ring (the ring is, for example, a cyclopentane ring, a cyclohexane ring, a cycloheptane ring), and the ring may form a condensed ring with any other ring. The condensed ring is preferably a hydrocarbon ring, and a condensed ring of plural rings is also preferred. The ring to be formed herein may be a saturated ring or an unsaturated ring (however, in principle, an aromatic ring could not be formed, and therefore, it is not an aromatic ring), but is preferably a saturated ring.

Concrete examples of the compounds of formula [1] are shown below; however, the compound of formula [1] for use in the invention should not be limited to these.

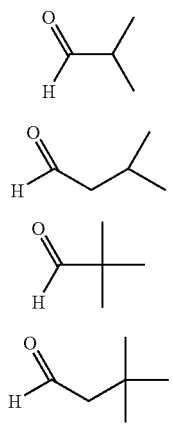

A-1

A-2

A-3

A-4

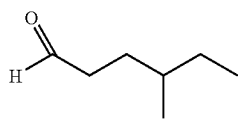
A-5

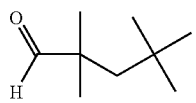
A-6

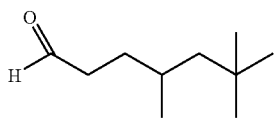
A-7

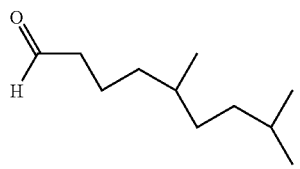
A-8

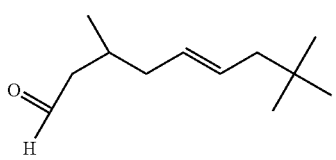
A-9

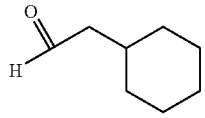
A-10

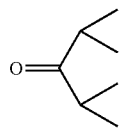
A-11

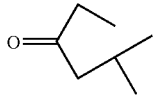
A-12

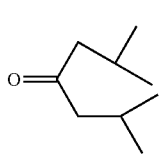
A-13

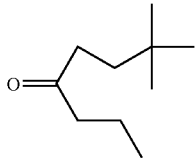
A-14

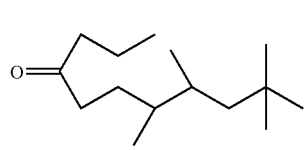
A-15

A-16
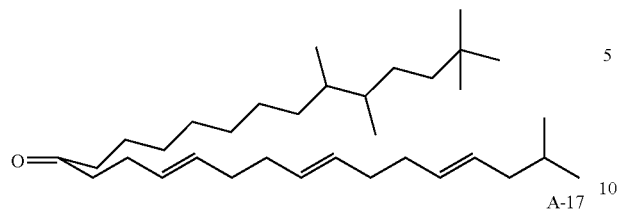
A-17
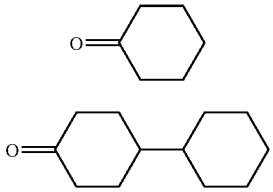
A-18
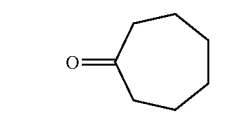
A-19
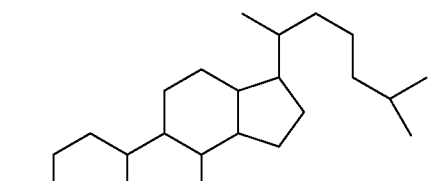
A-20
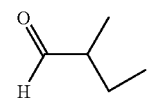
A-21
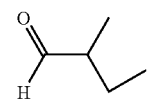
A-22
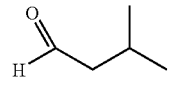
A-23
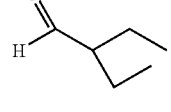
A-24
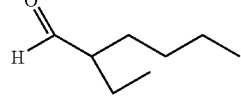
A-25
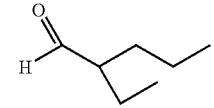
A-26
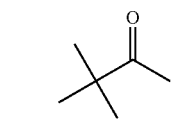
A-27
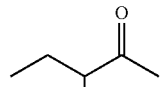
A-28
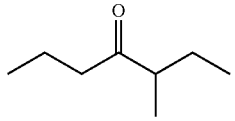
A-29
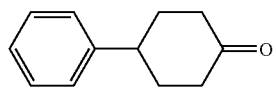
A-30
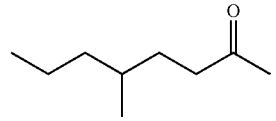
A-31
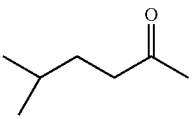
A-32
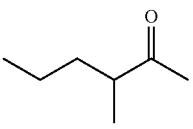
A-33
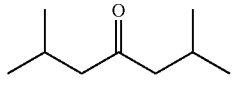
A-34
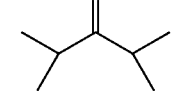
A-35
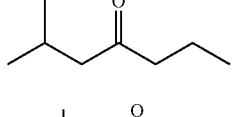
A-36
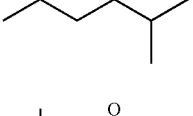
A-37
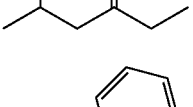
A-38
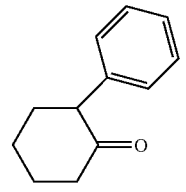
A-39

The amount of the compound of formula [1] that constitutes the polyvinyl acetal for use in the invention is preferably from 10% by mass to 100% by mass based on all the polymerization units to constitute the polymer, more preferably from 30% by mass to 95% by mass, even more preferably from 50% by mass to 90% by mass.

If desired, two or more different types of the compounds of formula [1] may be used herein, as combined.

Preferably, the mass-average molecular weight of the polymer for use in the invention is from 3,000 to 500,000, more preferably from 6,000 to 300,000, even more preferably from 8,000 to 200,000.

The mass-average molecular weight and the molecular weight as referred to herein are polystyrene-based molecular weights determined through detection with a differential refractometer in a solvent of THF, using a SPC analyzer with a column of TSK gel GMHxL, TSK gel G4000HxL, TSK gel G2000HxL (all trade names by Toso).

In general, the polyvinyl acetal for use in the invention is prepared by reacting a polyvinyl alcohol with an aldehyde and/or a ketone, using an acid catalyst, in water or in an organic solvent. In this, only a compound of formula [1] may be used as the aldehyde and/or the ketone; or a compound of formula [1] may be combined with an aldehyde and/or a ketone not represented by the formula [1].

The acid catalyst for acetalization includes an inorganic acid such as hydrochloric acid, sulfuric acid, phosphoric acid; as well as acetic acid, p-toluenesulfonic acid, etc. The amount of the catalyst to be used is preferably from 0-005 to 0.2 mols relative to 1 mol of the aldehyde and/or ketone for the reaction.

The acetalization temperature may be from 20° C. to 100° C. or so, preferably from 40° C. to 90° C.

Specific examples of the structures of the polyvinyl acetal for use in the invention are shown below; however, the polyvinyl acetal in the invention should not be limited to these. In the formulae, the numerals indicate the ratio by mass of the constitutive monomer components. Mw means a mass-average molecular weight.

AP-6
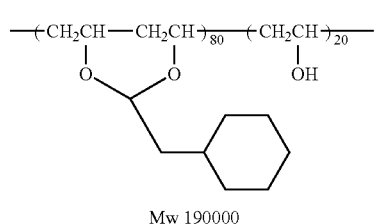
Mw 190000
AP-7
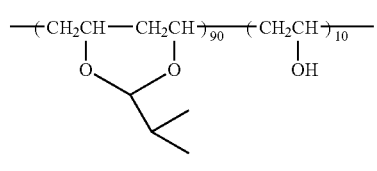
Mw 90000
AP-8
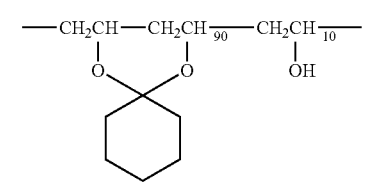
Mw 500000
AP-9
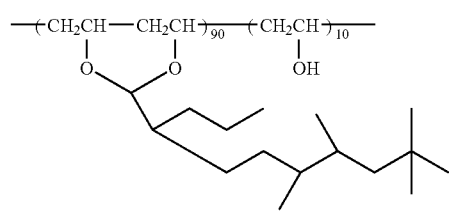
Mw 260000
AP-10
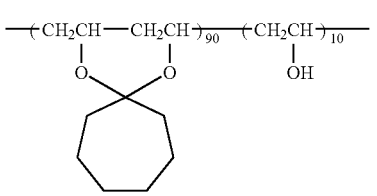
Mw 150000
AP-11
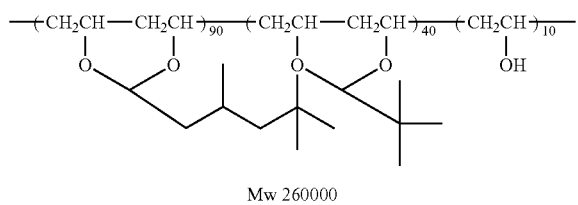
Mw 260000
AP-12
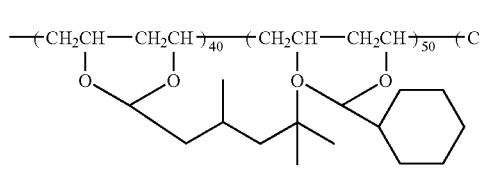
Mw 230000
AP-13
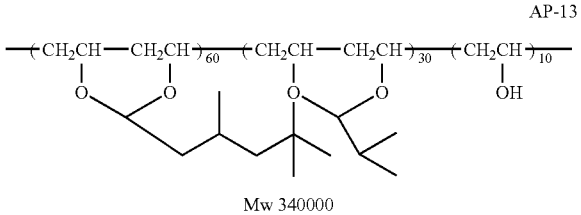
Mw 340000
AP-14
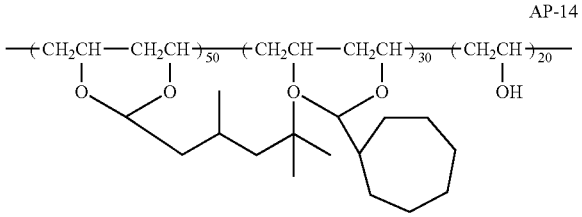
Mw 200000
AP-15
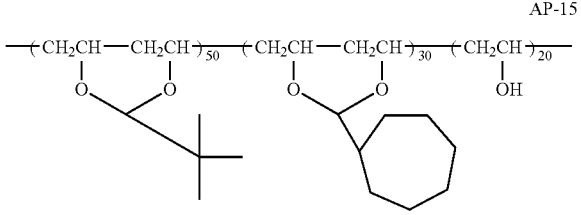
Mw 330000
AP-16
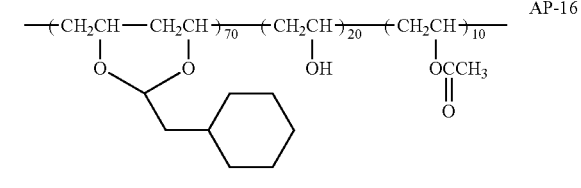
Mw 90000
AP-17
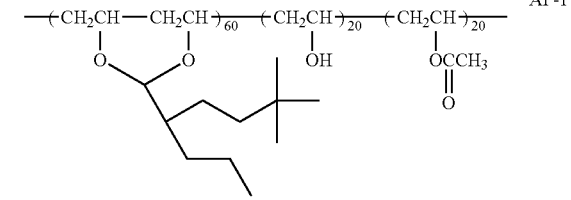
Mw 190000
AP-18
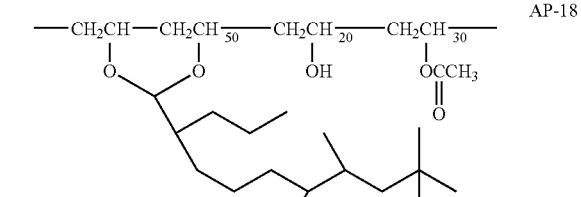
Mw 200000
AP-19
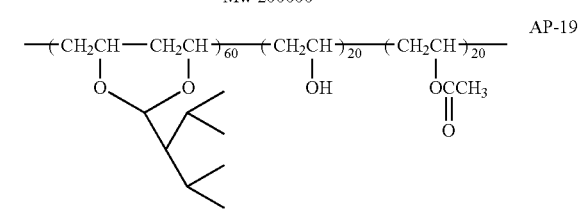
Mw 160000

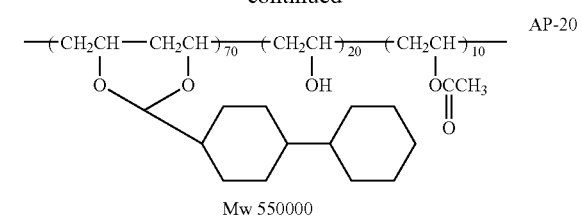

AP-20
Mw 550000

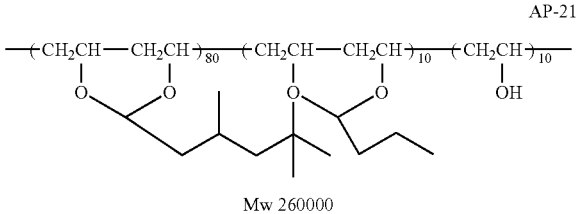

AP-21
Mw 260000

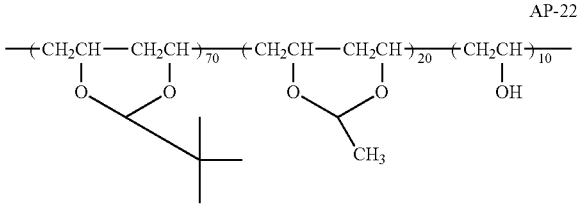

AP-22
Mw 230000

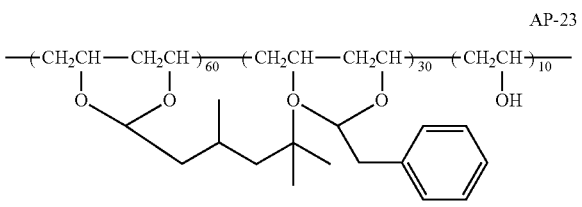

AP-23
Mw 340000

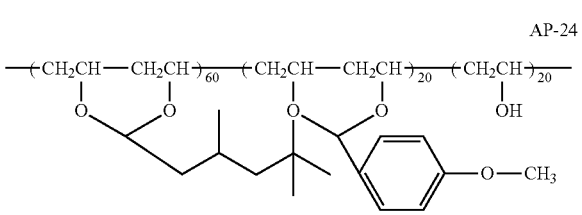

AP-24
Mw 200000

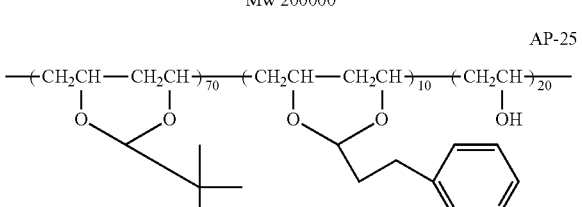

AP-25
Mw 330000

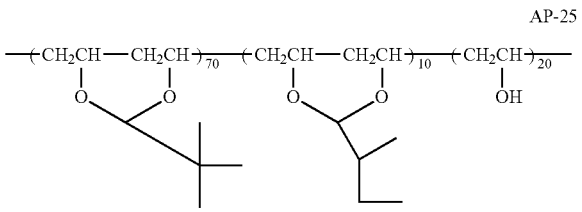

AP-25
Mw 330000

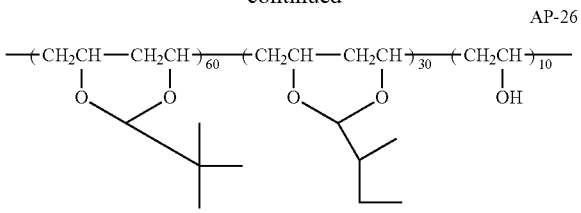

AP-26
Mw 430000

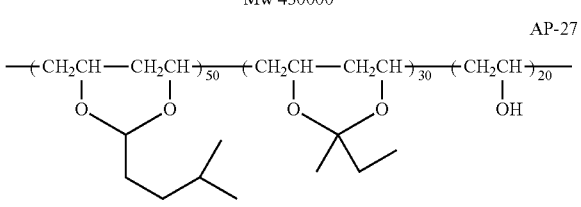

AP-27
Mw 220000

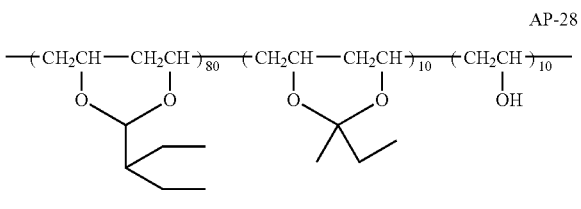

AP-28
Mw 140000

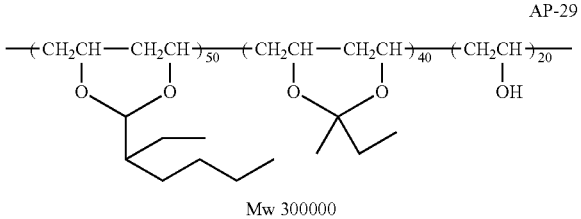

AP-29
Mw 300000

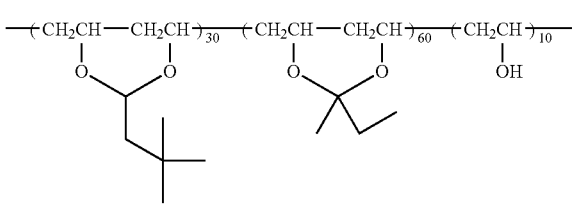

AP-30
Mw 500000

The polyvinyl acetal in the invention may be combined with any polymer. The polymer that may be combined with it is preferably transparent or semitransparent and colorless, including natural resins, polymers and copolymers, and synthetic resins, polymers and copolymers, and other film-forming media, for example, gelatins, polyvinyl alcohols, hydroxyethyl celluloses, cellulose acetates, cellulose acetate butyrates, polyvinylpyrrolidones, casein, starch, polyacrylic acids, polymethyl methacrylates, polyvinyl chlorides, polymethacrylic acids, styrene-maleic anhydride copolymers, styrene-acrylonitrile copolymers, styrene-butadiene copolymers, polyvinyl acetals (e.g., polyvinyl formal, polyvinyl butyral), polyesters, polyurethanes, phenoxy resins, polyvinylidene chlorides, polyepoxides, polycarbonates, polyvinyl acetates, polyolefins, polyamides. The binder may be formed from water or from an organic solvent or an emulsion by coating.

The dye layer of the thermal transfer ink sheet of the invention contains a thermal transferable dye and a polyvinyl acetal modified with at least one compound of the above formula [1]. Preferably, a coating composition for dye layer of thermal transfer ink sheet is applied onto a support to form the dye layer thereon.

The thermal transfer ink sheet of the invention contains a polyvinyl acetal modified with at least one compound of the above formula [1]. A thermal transfer recording ink sheet generally has a structure with a dye layer formed on a support, and a polyvinyl acetal modified with at least one compound of formula [1] is incorporated in the dye layer. The thermal transfer recording ink sheet of the invention may be produced by dissolving a thermal transferable dye in a solvent along with a polyvinyl acetal modified with at least one compound of formula [1] therein, or by dispersing it in a solvent as fine particles to prepare an ink, then applying the ink to a support, and suitably drying it to form a dye layer thereon.

As the support of the thermal transfer recording ink sheet of the invention, any ordinary one heretofore used as a support for ink sheets may be suitably selected and used. For example, the material described in JP-A 7-137466, paragraph [0050] may be favorably used. The thickness of the support is preferably from 2 to 30 μm.

The thermal transfer ink sheet of the invention may have any other layer than the dye layer within a range not too much detracting from the effect of the invention. For example, an interlayer may be provided between the support and the dye-donating layer; or a back layer may be provided on the surface of the support opposite to the side of the dye layer (this may be hereinafter referred to as "back surface"). The interlayer includes, for example, an undercoating layer, and a diffusion-preventing layer for preventing the dye from diffusing toward the support (hydrophilic barrier layer). The back layer is, for example, a heat-resistant slip layer, which is for preventing a thermal head from sticking to the ink sheet.

In case where the invention is applied to thermal transfer recording material that enables full-color image recording, it is desirable that a cyan ink sheet containing a thermal transferable cyan dye capable of forming cyan images, a magenta ink sheet containing a thermal transferable magenta dye capable of forming magenta images, and a yellow ink sheet containing a thermal transferable yellow dye capable of forming yellow images are formed successively on a support. If desired, an ink sheet containing a black image-forming substance may be further formed.

As the thermal transferable cyan dye-containing cyan ink sheet for forming cyan images, for example, preferably used are those described in JP-A 3-103477, 3-150194.

As the thermal transferable magenta dye-containing magenta ink sheet for forming magenta images, for example, preferably used are those described in JP-A 5-286268.

As the thermal transferable yellow dye-containing yellow ink sheet for forming yellow images, for example, preferably used are those described in JP-A 1-225592.

The content of the dye in the dye layer is preferably from 0.03 to 1.0 g/m$^2$, more preferably from 0.1 to 0.6 g/m$^2$. The thickness of the dye layer is preferably from 0.2 to 5 μm, more preferably from 0.4 to 2 μm.

The thermal transfer ink sheet of the invention may be charged in an ink cartridge. Regarding the structure of the ink cartridge and the charging method, any ones heretofore employed in the field of thermal transfer recording can be used in the invention. Concretely, the technique of cartridges as in JP-UM-A 63-161851, 1-101864 may apply also to the invention; and in particular, those described in JP-UN-A 1-101864 are more preferred.

In thermal transfer recording by the use of the thermal transfer ink sheet of the invention, a heating unit such as a thermal head and an image-receiving material are used as combined. Specifically, heat energy is applied to the ink sheet from a thermal head according to an image recording signal, and the dye in the part having received the heat energy is transferred to and fixed in an image-receiving sheet to attain image recording.

The receiving sheet to be combined with the ink sheet of the invention is described below.

(Receiving Sheet)

The thermal transfer image-receiving sheet has a dye-receiving layer (receiving layer) formed on a support. Preferably, an underlayer is formed between the receiving layer and the support, and for example, a white background-controlling layer, a static charge-controlling layer, an adhesive layer or a primer layer may be formed. Preferably, a heat-insulating layer is formed between the underlayer and the support. The layer between the support and the receiving layer may be referred to simply as "interlayer", and this includes the above underlayer and heat-insulating layer. The thermal transfer image-receiving sheet contains at least one receiving layer and at least one interlayer. On the back of the support, preferably formed is a curl-controlling layer, a writing layer or a static charge-controlling layer.

The receiving layer plays a role of receiving the dye transferred from an ink sheet and to keep the formed image. Accordingly, a dyeable resin (dyeable receiving polymer) is used in the receiving layer.

For example, usable are polyolefin resins such as polyethylene, polypropylene; halide resins such as polyvinyl chloride, polyvinylidene chloride; vinyl resins such as polyvinyl acetate, polyacrylates; and their copolymers; polyester resins such as polyethylene terephthalate, polybutylene terephthalate; polystyrene resins, polyamide resins, polycarbonates, phenol resins, polyurethanes, epoxy resins, polysulfones, butyral resins, melamine resins, polyvinyl alcohols, copolymers of olefin such as ethylene or propylene with any other vinyl monomer; vinyl chloride-vinyl acetate copolymers, styrene-acryl copolymers, ionomers, cellulose resins, natural rubbers, synthetic rubbers; and these may be used either singly or as their mixtures; however, the invention should not be limited to these. Preferably, the receiving polymer to be used in the receiving layer is in the form of a polymer latex.

<Polymer Latex>

The polymer latex is described. In a thermal transfer image-receiving sheet, the polymer latex to be in the receiving layer is a dispersion of water-insoluble hydrophobic polymer particles dispersed in a water-soluble dispersion medium. The dispersion may be any one prepared by emulsifying a polymer in a dispersion medium, one prepared by emulsification and polymerization, one prepared by micelle dispersion, or a molecular dispersion of polymer molecules partially having a hydrophilic structure, in which the molecular chains themselves are molecularly dispersed. The polymer latex is described, for example, in Taira Okuda & Hiroshi Inagaki, "Synthetic Resin Emulsion", issued by the Polymer Publishing, 1979; Takaaki Sugimura, Yasuo Kataoka, Soichi Suzuki, & Keiji Kasahara, "Applications of Synthetic Latex", issued by the Polymer Publishing, 1993; Soichi Muroi, "Chemistry of Synthetic Latex", issued by the Polymer Publishing, 1970; Yoshiaki Miyosawa, "Development and Application of Water-Base Coating Material", by CMC, 2004; and JP-A 64-538. The mean particle size of the dispersion particles is preferably within a range of from 1 to 50000 nm, more preferably from 5 to 1000 nm. The particle size distribution of the dispersion particles is not specifically defined, and the particles may have a broad particle size distribution or may have a monodispersion particle size distribution.

The polymer latex may be an ordinary uniform-structured polymer latex, and in addition, it may also be a core/shell-structured polymer latex. In the latter case, it is often desirable that the core and the shell have a different glass transition temperature. The glass transition temperature of the polymer latex for use in the invention is preferably from −30° C. to 130° C., more preferably from 0° C. to 100° C., even more preferably from 10° C. to 80° C.

As preferred embodiments of the polymer latex; hydrophobic polymers are preferably used therein, including, for example, acrylic polymers, polyesters, rubbers (e.g., SBR resin), polyurethanes, polyvinyl chlorides, polyvinyl acetates, polyvinylidene chlorides, polyolefins. These polymers may be linear polymers, or branched polymers, or crosslinked polymers, and they may be homopolymers formed by polymerization of a single monomer or copolymers formed by copolymerization of two or more different monomers. The copolymers may be random copolymers or block copolymers. Preferably, the number-average molecular weigh: of the polymer is from 5000 to 1000000, more preferably from 10000 to 500000. In case where a polymer having a too small molecular weight is used, the mechanical strength of the layer containing the polymer latex may be insufficient; but when a polymer having a too large molecular weight is used, then it is unfavorable since its film formability is poor. Across linked polymer latex is also preferably used in the invention.

Not specifically defined, the monomer for use in producing the polymer latex may be any one capable of polymerizing in an ordinary radical polymerization or ionic polymerization method. For example, preferred are those of the following monomer groups (a) to (j). From these monomers, any ones may be independently suitably selected and combined and used in producing the polymer latex for use herein.

—Monomer Groups (a) to (j)—

(a) Conjugated dienes: 1,3-pentadiene, isoprene, 1-phenyl-1,3-butadiene, 1-α-naphthyl-1,3-butadiene, 1-β-naphthyl-1,3-butadiene, cyclopentadiene, etc.

(b) Olefins: ethylene, propylene, vinyl chloride, vinylidene chloride, 6-hydroxy-1-hexene, 4-pentenoic acid, methyl 8-nonenoate, vinylsulfonic acid, trimethylvinylsilane, trimethoxyvinylsilane, 1,4-divinylcyclohexane, 1,2,5-trivinylcyclohexane, etc.

(c) α,β-unsaturated carboxylates: alkyl acrylates (e.g., methyl acrylate, ethyl acrylate, butyl acrylate, cyclohexyl acrylate, 2-ethylhexyl acrylate, dodecyl acrylate), substituted alkyl acrylates (e.g., 2-chloroethyl acrylate, benzyl acrylate, 2-cyanoethyl acrylate), alkyl methacrylates (e.g., methyl methacrylate, butyl methacrylate, 2-ethylhexyl methacrylate, dodecyl methacrylate), substituted alkyl methacrylates (e.g., 2-hydroxyethyl methacrylate, glycidyl methacrylate, glycerin monomethacrylate, 2-acetoxyethyl methacrylate, tetrahydrofurfuryl methacrylate, 2-methoxyethyl methacrylate, polypropylene glycol monomethacrylate (molar number of added polyoxypropylene 2 to 100), 3-N,N-dimethylaminopropyl methacrylate, chloro-3-N,N-trimethylammoniopropyl methacrylate, 2-carboxyethyl methacrylate, 3-sulfopropyl methacrylate, 4-oxysulfobutyl methacrylate, 3-trimethoxysilylpropyl methacrylate, allyl methacrylate, 2-isocyanatoethyl methacrylate), unsaturated dicarboxylic acid derivatives (e.g., monobutyl maleate, dimethyl maleate, monomethyl itaconate, dibutyl itaconate), polyfunctional esters (e.g., ethylene glycol diacrylate, ethylene glycol dimethacrylate, 1,4-cyclohexane diacrylate, pentaerythritol tetramethacrylate, pentaerythritol triacrylate, trimethylolpropane triacrylate, trimethylolethane triacrylate, dipentaerythritol pentamethacrylate, pentaerythritol hexaacrylate, 1,2,4-cyclohexane tetraacrylate), etc.

(d) α,β-unsaturated carboxylic acid amides: for example, acrylamide, methacrylamide, N-methylmethacrylamide, N,N-dimethylacrylamide, N-methyl-N-hydroxyethylmethacrylamide, N-tert-butylacrylamide, N-tert-octylmethacrylamide, N-cyclohexylacrylamide, N-phenylacrylamide, N-(2-acetacetoxyethyl)acrylamide, N-acryloylmorpholine, diacetonacrylamide, itaconic acid diamide, N-methylmaleimide, 2-acrylamide-methylpropanesulfonic acid, methylenebisacrylamide, dimethacryloylpiperazine, etc.

(e) Unsaturated nitriles: acrylonitrile, methacrylonitrile, etc.

(f) Styrene and its derivatives: styrene, vinyltoluene, p-tert-butylstyrene, vinylbenzoic acid, methyl vinylbenzoate, α-methylstyrene, p-chloromethylstyrene, vinylnaphthalene, p-hydroxymethylstyrene, sodium p-styrenesulfonate, potassium p-styrenesulfinate, p-aminomethylstyrene, 1,4-divinylbenzene, etc.

(g) Vinyl ethers: methyl vinyl ether, butyl vinyl ether, methoxyethyl vinyl ether, etc.

(h) Vinyl esters: vinyl acetate, vinyl propionate, vinyl benzoate, vinyl salicylate, vinyl chloroacetate, etc.

(i) α,β-unsaturated carboxylic acids and their salts: acrylic acid, methacrylic acid, itaconic acid, maleic acid, sodium acrylate, ammonium methacrylate, potassium itaconate, etc.

(j) Other polymerizing monomers: N-vinylimidazole, 4-vinylpyridine, N-vinylpyrrolidone, 2-vinyloxazoline, 2-isopropenyloxazoline, divinylsulfone, etc.

Polymer latex is commercially available, and the following polymers are usable. Examples of acrylic polymers are Daicel Chemical Industry's Sevian A-4635, 4718, 4601; Nippon Zeon's Nipol Lx811, 814, 821, 820, 855 (P-17: Tg 36° C.), 857x2 (P-18: Tg 43° C.); Dai-Nippon Ink Chemical's Voncoat R3370 (P-19: Tg 25° C.), 4280 (P-20: Tg 15° C.), Nippon Pure Chemicals' Jurymer ET-410 (P-21; Tg 44° C.), JSR's AE116 (P-22: Tg 50° C.), AE119 (P-23: Tg 55° C.), AE121 (P-24: Tg 58° C.), AE125 (P-25: Tg 60° C.), AE134 (P-26: Tg 48° C.), AE137 (P-27: Tg 48° C.), AE140 (P-28: Tg 53° C.), AE173 (P-29: Tg 60° C.), Toa Gosei's Aron A-104 (P-30: Tg 45° C.), Taklamatsu Yushi's NS-600X, NS-620X, Nisshin Chemical Industry's Vinybran 2580, 2583, 2641, 2770, 2770H, 2635, 2886, 5202C, 2706 (all trade names).

Examples of polyesters are Dai-Nippon Ink Chemical's FINETEX ES650, 611, 675, 850, Eastman Chemical's WD-size, WMS, Takamatsu Yushi's A-110, A-115GE, A-120, A-121, A-124GP, A-124S, A-160P, A-210, A-215GE, A-510, A-513E, A-515GE, A-520, A-610, A-613, A-615GE, A-620, WAC-10, WAC-15, WAC-17XC, WAC-20, S-110, S-110EA, S-111SL, S-120, S-140, S-140A, S-250, S-2520, S-250S, S-320, S-680, DNS-63P, NS-122L, NS-122LX, NS-244LX, NS-140L, NS-141LX, NS-282LX, Toa Gosei's Aron Melt PES-1000 Series, PES-2000 Series, Toyobo's Vylonal MD-1100, MD-1200, MD-1220, MD-1245, MD-1250, MD-1335, MD-1400, MD-1480, MD-1500, MD-1930, MD-1985, Sumitomo Seika's Ceporjon ES (all trade names).

Examples of polyurethanes are Dai-Nippon Ink Chemical's HYDRAN AP10, AP20, AP30, AP40, 101H, Vondic 1320NS, 1610NS, Dainichi Seika's D-1000, D-2000, D-6000, D-4000, D-9000, Takamatsu Yushi's NS-155X, NS-310A, NS-310X, NS-311X, Dai-ichi Kogyo Pharmaceutical's Elastron (all trade names).

Examples of rubbers are LACSTAR 7310K, 3307B, 4700H, 7132C (all by Dai-Nippon Ink Chemical), Nipol Lx416, Lx410, LX430, LX435, LX110, LX415A, LX438C, 2507H, LX303A, LX407BP Series, V1004, MH5055 (all by Nippon Zeon) (all trade names).

Examples of polyvinyl chlorides are Nippon Zeon's G351, G576, Nisshin Chemical Industry's Vinybran 240, 270, 277, 375, 386, 609, 550, 601, 602, 630, 660, 671, 683, 680, 680S, 681N, 635R, 277, 380, 381, 410, 430, 432, 860, 863, 865, 867, 900, 900GT, 938, 950 (all trade names). Examples of polyvinylidene chlorides are Asahi Kasei's L502, L513, Dai-Nippon Ink Chemical's D-5071 (all trade names). Examples of polyolefins are Mitsui Petrochemical's Chemipearl S120, SA100, V300 (P-40: Tg 80° C.), Dai-Nippon Ink Chemical's Voncoat 2830, 2210, 2960, Sumitomo Seika's Zaikthene, Ceporjon G; and examples of copolymer nylons are Sumitomo Seika's Ceporjon PA (all trade names).

Examples of polyvinyl acetates are Nisshin Chemical Industry's Vinybran 1080, 1082, 1085W, 1108W, 1108S, 1563M, 1566, 1570, 1588C, A22J7-F2, 1128C, 1137, 1138, A20J2, A23J1, A23K1, A23P2E, A68J1N, 1086A, 1086, 1086D, 1108S, 1187, 1241LT, 1580N, 1083, 1571, 1572, 1581, 4465, 4466, 4468W, 4468S, 4470, 4485LL, 4495LL, 1023, 1042, 1060, 1060S, 1080M, 1084W, 1084S, 1096, 1570K, 1050, 1050S, 3290, 1017AD, 1002, 1006, 1008, 1107L, 1225, 1245L, GV-6170, GV-6181, 4468W, 4468S (all trade names).

One or more these polymer latexes may be used herein either singly or as combined.

Specific examples of the structures of polymer latexes are shown below; however, the polymer latex usable in the invention should not be limited to these. The numerals in the formulae indicate the ratio by weight of the constitutive monomer components. Mw means a mass-average molecular weight.

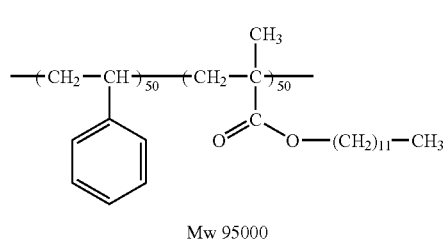
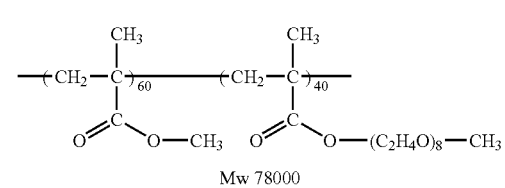
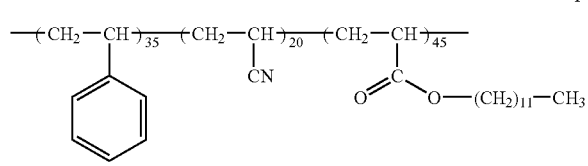
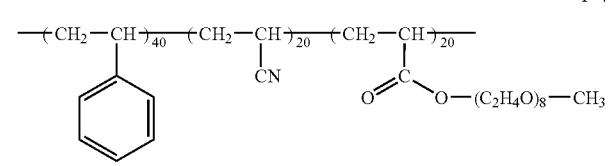
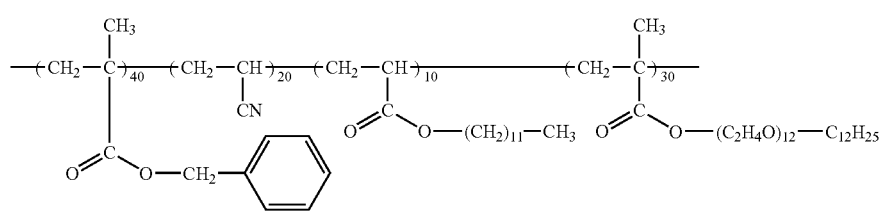
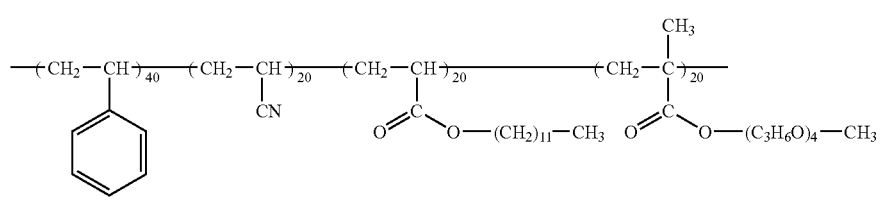
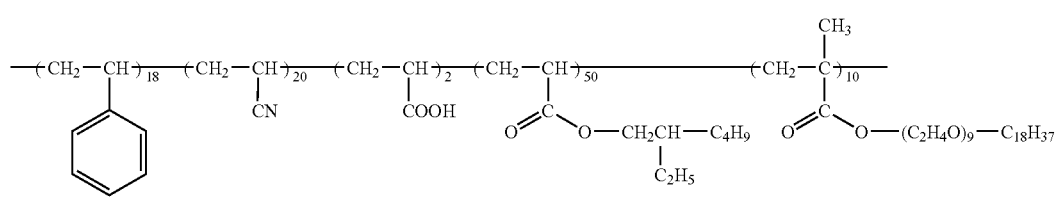

-continued
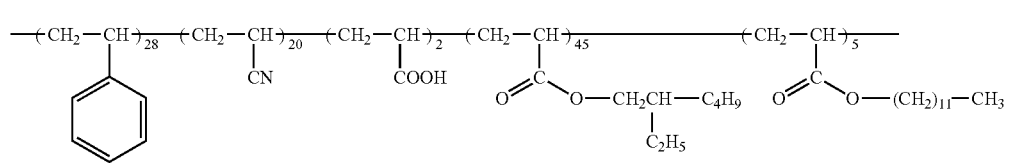
P-8
Mw 150000
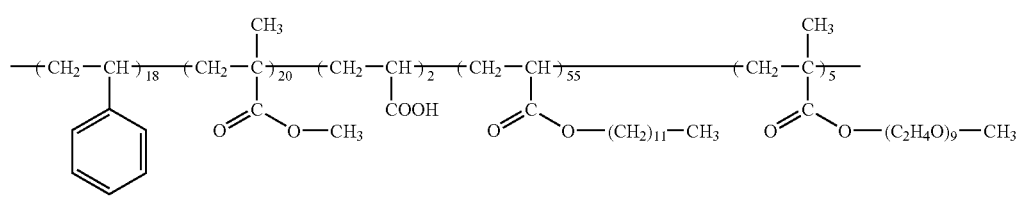
P-9
Mw 220000
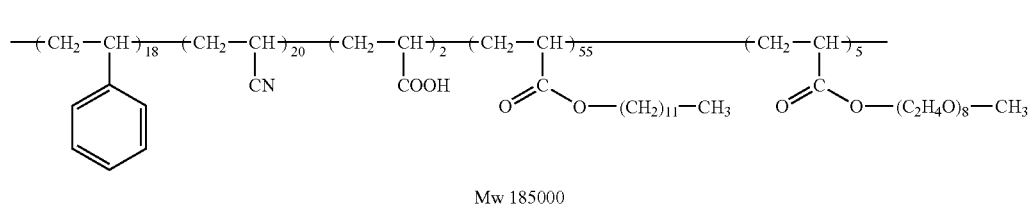
P-10
Mw 185000
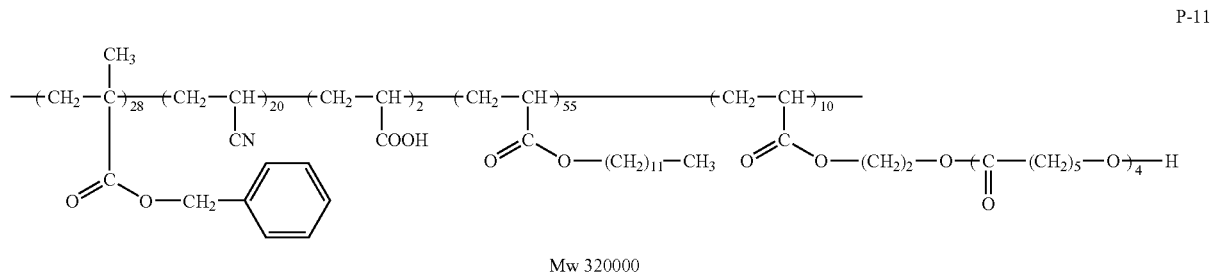
P-11
Mw 320000
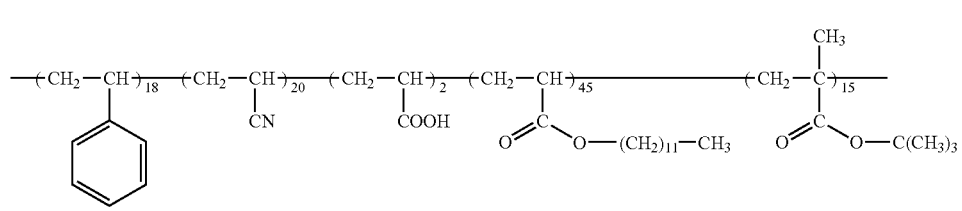
P-12
Mw 110000
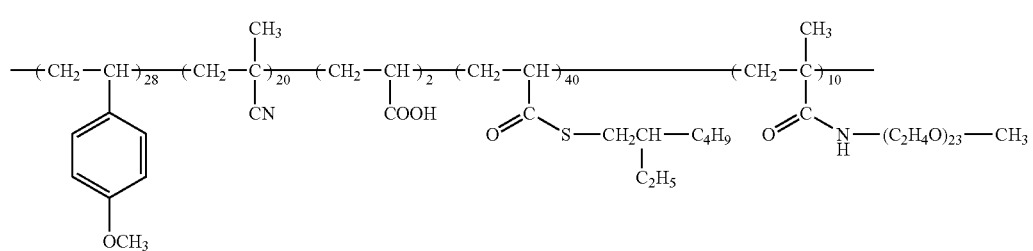
P-13
Mw 95000
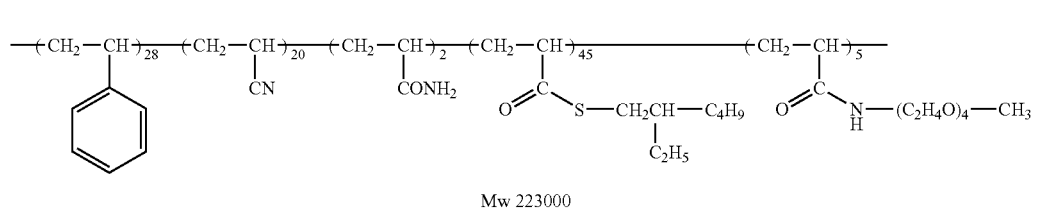
P-14
Mw 223000

-continued
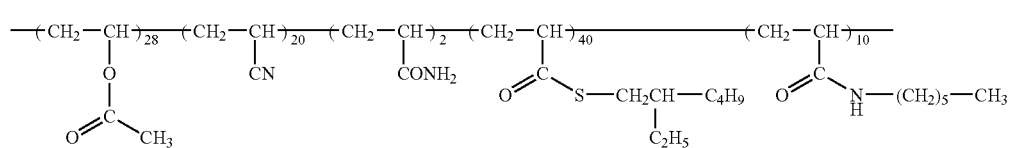
P-15
Mw 290000
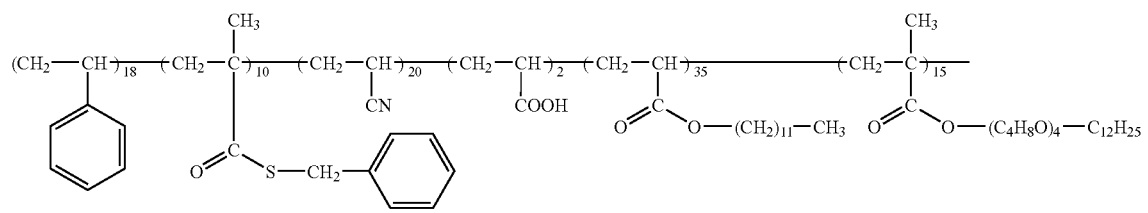
P-16
Mw 182000
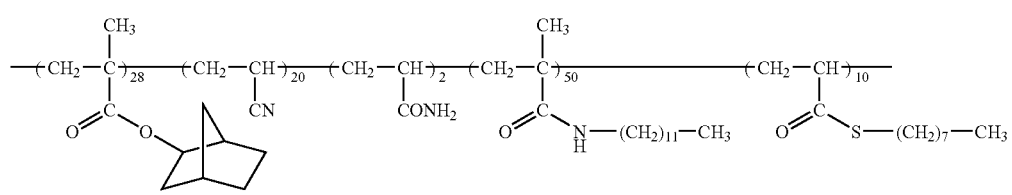
P-17
Mw 186000
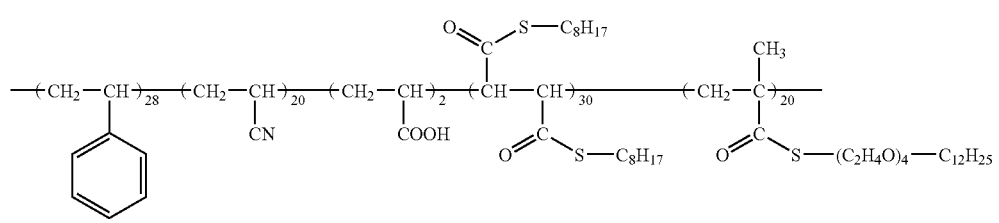
P-18
Mw 350000
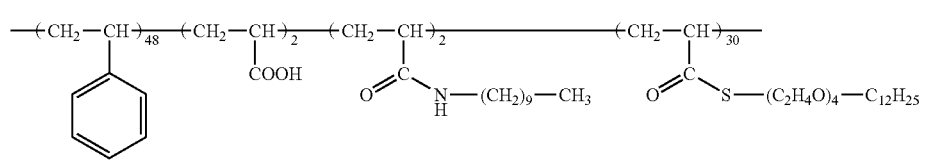
P-19
Mw 111000
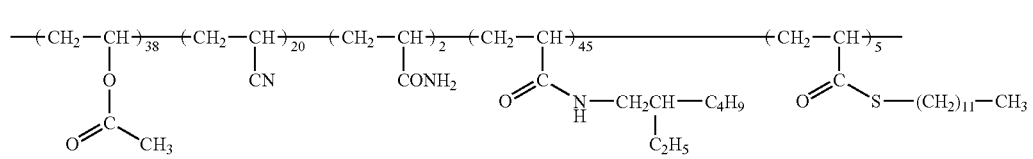
P-20
Mw 172000
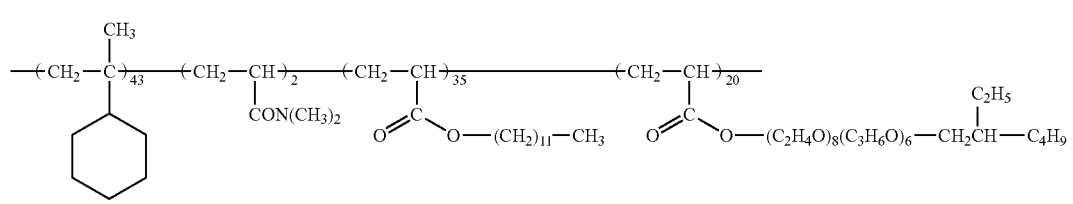
P-21
Mw 299000

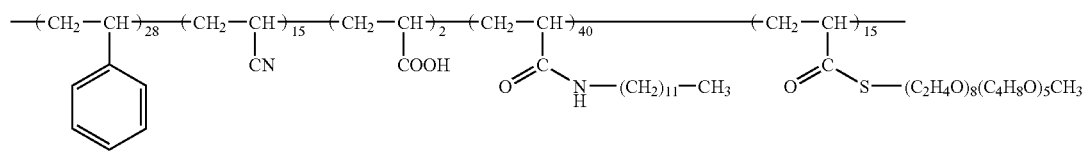

Mw 422000

P-22

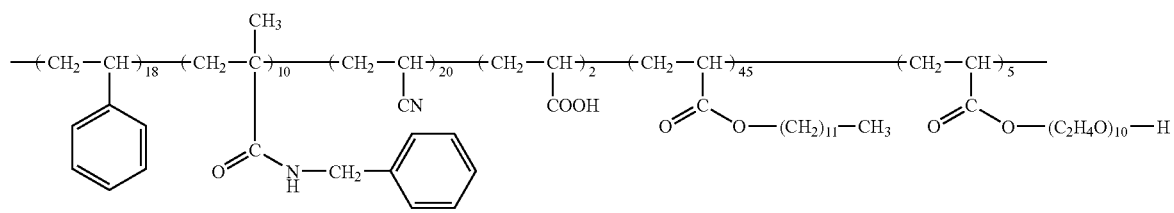

Mw 56000

P-23

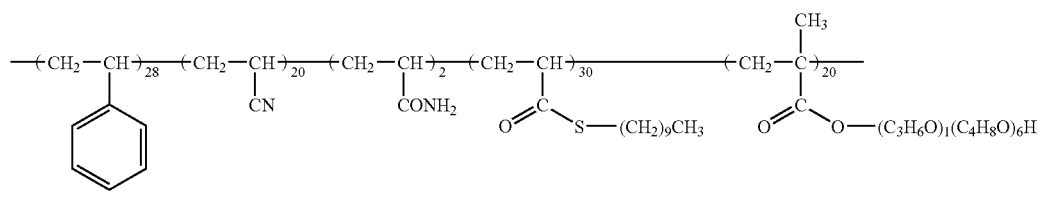

Mw 250000

P-24

EXAMPLES

The characteristics of the invention are described more concretely with reference to Production Examples and Examples given below.

In the following Examples, the material used, its amount and the ratio, the details of the treatment and the treatment process may be suitably modified or changed not overstepping the scope of the invention. Accordingly, the invention should not be limitatively interpreted by the Examples mentioned below.

Example 1

(Production of Polymer)

<Production of AP-1>

Polyvinyl alcohol (PVA110, by Kuraray) (20 g), methylene chloride (400 g), hydrochloric acid (2.0 g) and A-7 (96 g) were put into a reactor equipped with a stirrer and a reflux condenser, and heated at 40° C. for 40 hours to complete the reaction. Next, the reaction liquid was reprecipitated in methanol to obtain a reaction product. Its mass-average molecular weight was $1.6 \times 10^6$.

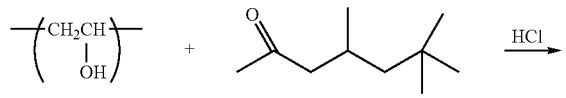

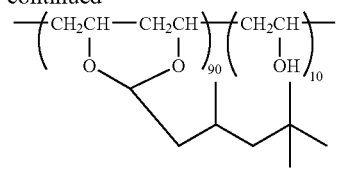

AP-7, AP-11, AP-1S, AP-22 were produced in the same manner as that for AP-1.

(Fabrication of Ink Sheet)

(2-1) Fabrication of Sample 101 (the Invention):

A polyester film (Lumirror, trade name by Toray) having a thickness of 6.0 μm was used as a support film. A heat-resistant slip layer (thickness 1 μm) was formed on the back of the film, and to its surface, yellow, magenta and cyan compositions mentioned below were applied each as single color (coating amount of the dry film, 1 g/m$^2$).

Yellow Ink:

| | |
|---|---|
| Dye (Macrolex Yellow 6G, trade name by Bayer) | 5.5 mas. pts. |
| Polymer AP-1 | 4.4 mas. pts. |
| Methyl ethyl ketone/toluene (1/1 by mass) | 90 mas. pts. |

Magenta Ink:

| | |
|---|---|
| Magenta dye (Disperse Red 60) | 5.5 mas. pts. |
| Polymer AP-1 | 4.4 mas. pts. |
| Methyl ethyl ketone/toluene (1/1 by mass) | 90 mas. pts. |

Cyan Ink:

| | |
|---|---|
| Cyan dye (Disperse Red 63) | 5.5 mas. pts. |
| Polymer AP-1 | 4.4 mas. pts. |
| Methyl ethyl ketone/toluene (1/1 by mass) | 90 mas. pts. |

(2-2) Fabrication of Sample 102 (the Invention):
A sample 102 of the invention was fabricated in the same manner as that for the sample 101, for which, however, the compound AP-1 was changed to AP-7.

(2-3) Fabrication of Sample 103 (the Invention):
A sample 103 of the invention was fabricated in the same manner as that for the sample 101, for which, however, the Compound AP-1 was changed to AP-1.

(2-4) Fabrication of Sample 104 (the Invention):
A sample 104 of the invention was fabricated in the same manner as that for the sample 101, for which, however, the compound AP-1 was changed to AP-18.

(2-5) Fabrication of Sample 105 (the Invention):
A sample 105 of the invention was fabricated in the same manner as that for the sample 101, for which, however, the compound AP-1 was changed to AP-22:

(2-6) Fabrication of Sample 10G (Comparative Example):
A polyester film (Lumirror, trade name by Toray) having a thickness of 6.0 µm was used as a support film. A heat-resistant slip layer (thickness 1 µm) was formed on the back of the film, and to its surface, yellow, magenta and cyan compositions mentioned below were applied each as single color (coasting amount of the dry film, 1 g/m²).

Yellow Ink:

| | |
|---|---|
| Dye (Macrolex Yellow 6G, trade name by Bayer) | 5.5 mas. pts. |
| Polyvinyl butyral (Eslec BX-1, trade name by Sekisui Chemical Industry) | 4.5 mas. pts. |
| Methyl ethyl ketone/toluene (1/1 by mass) | 90 mas. pts. |

Magenta Ink:

| | |
|---|---|
| Magenta dye (Disperse Red 60) | 5.5 mas. pts. |
| Polyvinyl butyral (Eslec BX-1, trade name by Sekisui Chemical Industry) | 4.5 mas. pts. |
| Methyl ethyl ketone/toluene (1/1 by mass) | 90 mas. pts. |

Cyan Ink:

| | |
|---|---|
| Cyan dye (Disperse Red 63) | 5.5 mas. pts. |
| Polyvinyl butyral (Eslec BX-1, trade name by Sekisui Chemical Industry) | 4.5 mas. pts. |
| Methyl ethyl ketone/toluene (1/1 by mass) | 90 mas. pts. |

(2-7) Fabrication of Sample 107 (Comparative Example):
An ink sheet of Example 1 described in JP-A 4-45993 was fabricated.

(2-8) Fabrication of Sample 08 (Comparative Example):
An ink sheet of Example 1 described in JP-A 2002-307844 was fabricated.

(Fabrication of Image-Receiving Sheet)
<Image-Receiving Sheet 1>
The surface of a paper support double-laminated with polyethylene was processed for corona discharge treatment, and then a sodium dodecylbenzenesulfonate-containing gelatin underlayer was formed on it. On this, an interlayer A having the composition mentioned below was formed, using a bar coater, and dried, and then a receiving layer A having the composition mentioned below was formed, using a bar coater, and dried. The bar coating was attained at 40° C., and the drying was attained at 50° C. for 16 hours for every layer. The layer formation by coating was so controlled that the dry coating amount of the interlayer A could be 10 g/m² and that of the receiving layer A could be 2.5 g/m².

Interlayer A:

| | |
|---|---|
| Polyester resin (Vylon 200, trade name by Toyobo) | 10 mas. pts. |
| Fluorescent brightener (Uvitex OB, trade name by Ciba-Geigy) | 1 mas. pts. |
| Titanium oxide | 30 mas. pts. |
| Methyl ethyl ketone/toluene (1/1 by mass) | 90 mas. pts. |

Receiving Layer A:

| | |
|---|---|
| Polyester resin (resin described in Example 1 in JP-A 2-265789) | 100 mas. pts. |
| Amino-modified silicone (Shin-etsu Chemical Industry's trade name, X-22-3050C) | 5 mas. pts. |
| Epoxy-modified silicone (Shin-etsu Chemical Industry's trade name, X-22-300E) | 5 mas. pts. |
| Methyl ethyl ketone/toluene (1/1 by mass) | 400 mas. pts. |

(Image Formation)
The above ink sheets and the image-receiving sheet 1 were processed so as to be charged in a sublimation-type printer, Nippon Densan Copal's ASK2000 (trade name). Set in the printer, these were tested for image outputting according to a high-speed print mode to give a black solid image.

(Relative Transfer Density Evaluation)
The visual density of the black image obtained under the above condition was determined, using Photographic Densitometer (trade name by X-Rite Incorporated). Table 1 shows the relative value of the transfer density of each sample, based on the standard value 100 of sample 106.

(Ink Stickiness Evaluation)
For evaluation of ink stickiness, the print part giving Dmax of the image was checked for the ink stickiness condition, according to the following criteria.

Evaluation Ranks:
5: The image-receiving sheet smoothly peeled from the ink sheet, with no ink fusion (stickiness) to the image receiving sheet.
4: The area where the two stuck to each other was at most 1% relative to the print area of the density region that was sticky.
3: The area where the two stuck to each other was more than 1% and at most 10% relative to the print area of the density region that was sticky.
2: The area where the two stuck to each other was more than 10% and at most 20% relative to the print area of the density region that was sticky.
1: The area where the two stuck to each other was more than 20% relative to the print area of the density region that was sticky.

The obtained results are shown in Table 1.

(Background Soiling Evaluation)
The thermal transfer ink sheet and the image-receiving sheet were put one upon another in such a manner that the dye layer and the image-receiving layer could face each other, and this was led to pass through a hot roll laminator so that the surface temperature of the thermal transfer ink sheet could be 70° C., and then the density of the dye transferred to the dye-receiving layer was measured with Photographic Densitometer (by X-Rite Incorporated). Before and after the test, the density change (ΔD) was computed.

TABLE 1

|  | Relative Transfer Density | Ink Stickiness | Background Soiling |
| --- | --- | --- | --- |
| Sample 101 (Example) | 125 | 5 | 0.03 |
| Sample 102 (Example) | 120 | 5 | 0.05 |
| Sample 103 (Example) | 115 | 5 | 0.04 |
| Sample 104 (Example) | 125 | 5 | 0.04 |
| Sample 105 (Example) | 115 | 5 | 0.05 |
| Sample 106 (Comparative Example) | 100 | 5 | 0.08 |
| Sample 107 (Comparative Example) | 110 | 3 | 0.12 |
| Sample 108 (Comparative Example) | 100 | 5 | 0.08 |

As is obvious from the results in Table 1, the samples 106 and 108 could not give an increased relative transfer density in high-speed transfer recording. The sample 107 gave an increased relative transfer density, but had a problem of ink stickiness.

It is known that the samples 101 to 105 of the invention all had an excellent relative transfer density with no ink stickiness. Accordingly, using the specific resin binder in the invention makes it possible to provide a thermal transfer ink sheet of high sensitivity with few surface defects.

Example 2

Samples were fabricated in the same manner as in Example 1, for which, however, the image-receiving sheet 1 was changed to an image-receiving sheet 2 mentioned below.
<Image-Receiving Sheet 2>

The surface of a paper support double-laminated with polyethylene was processed for corona discharge treatment, and then a sodium dodecylbenzenesulfonate-containing gelatin underlayer was formed on it. On this, an interlayer B and a receiving layer B each having the composition mentioned below were laminated by coating in that order from the support, according to the method illustrated in FIG. 9 in U.S. Pat. No. 2,761,791. Immediately after the coating, this was dried at 50° C. for 16 hours. The layer formation was so controlled that the dry coating amount of the interlayer B could be 15 g/m² and that of the receiving layer B could be 2.5 g/m².
Interlayer 2:

| Hollow polymer latex (MH5055, trade name by Nippon Zeon) | 563 mas. pts. |
| --- | --- |
| Gelatin | 120 mas. pts. |

In this, the hollow polymer latex is an aqueous dispersion of a hollow-structured polymer having an outer diameter of 0.5 μm.
Receiving Layer B:

| Polymer P-9 | 48 mas. pts. |
| --- | --- |
| Benzotriazole-type UV absorbent polymer latex (ULS1700, trade name by Ipposha Yushi Kogyo) | 15 mas. pts. |
| Montan wax (J537, trade name by Chukyo Yushi) | 10 mas. pts. |

The samples were tested in the same manner as in Example 1. The samples of this Example also had good ink stickiness resistance, and their relative transfer density was higher than that in Example 1.

The results are shown in Table 2.

TABLE 2

|  | Relative Transfer Density | Ink Stickiness | Background Soiling |
| --- | --- | --- | --- |
| Sample 101' (Example) | 130 | 5 | 0.03 |
| Sample 102' (Example) | 130 | 5 | 0.05 |
| Sample 103' (Example) | 125 | 5 | 0.04 |
| Sample 104' (Example) | 135 | 5 | 0.04 |
| Sample 105' (Example) | 135 | 5 | 0.05 |
| Sample 106' (Comparative Example) | 100 | 5 | 0.08 |
| Sample 107' (Comparative Example) | 110 | 4 | 0.12 |
| Sample 108' (Comparative Example) | 100 | 5 | 0.08 |

The present disclosure relates to the subject matter contained in Japanese Patent Application No. 092239/2007 filed on Mar. 30, 2007, which is expressly incorporated herein by reference in its entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A thermal transfer ink sheet comprising, as formed on a supports a dye layer containing a thermal transferable dye in a resin binder, wherein the dye layer contains a polyvinyl acetal modified with at least one compound of the following formula [1]:

[1]

wherein one of $R^1$ and $R^2$ is a branched hydrocarbon group and the other is a hydrogen atom or a hydrocarbon group, or $R^1$ and $R^2$ are groups that bond to each other to form a cyclic hydrocarbon.

2. The thermal transfer ink sheet according to claim 1, wherein, in formula [1], one of $R^1$ and $R^2$ is a branched hydrocarbon group having from 4 to 50 carbon atoms, or $R^1$ and $R^2$ are groups that bond to each other to form a cyclic hydrocarbon.

3. The thermal transfer ink sheet according to claim 1, wherein, in formula [1], one of $R^1$ and $R^2$ is a branched hydrocarbon group having from 8 to 40 carbon atoms, or $R^1$ and $R^2$ are groups that bond to each other to form a cyclic hydrocarbon.

4. An ink cartridge filled with the thermal transfer ink sheet of claim 1.

5. A thermal transfer recording method comprising forming an image by applying heat to the thermal transfer ink sheet of claim 1 on an image-receiving sheet comprising a polymer latex-containing ink-receiving layer on a support.

6. A coating composition for forming a dye layer of a thermal transfer ink sheet, containing a thermal transferable dye and a polyvinyl acetal modified with at least one compound of the following formula [1]:

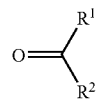

[1]

wherein one of $R^1$ and $R^2$ is a branched hydrocarbon group and the other is a hydrogen atom or a hydrocarbon group, or $R^1$ and $R^2$ are groups that bond to each other to form a cyclic hydrocarbon.

* * * * *